United States Patent [19]

Gaffal

[11] Patent Number: 4,614,482
[45] Date of Patent: Sep. 30, 1986

[54] PRESSURE EQUALIZING DEVICE FOR THE ELECTRIC MOTOR OF AN ENCAPSULATED MOTOR-PUMP ASSEMBLY

[75] Inventor: Karl Gaffal, Hessheim, Fed. Rep. of Germany

[73] Assignee: Klein, Schanzlin & Becker Aktiengesellschaft, Frankenthal, Fed. Rep. of Germany

[21] Appl. No.: 375,001

[22] Filed: May 5, 1982

[30] Foreign Application Priority Data

May 21, 1981 [DE] Fed. Rep. of Germany ....... 3120232

[51] Int. Cl.[4] ...................... F04B 17/00; F04B 35/00; F04B 39/06
[52] U.S. Cl. ..................................... 417/367; 417/373
[58] Field of Search .................. 60/367; 417/373, 368; 310/87

[56] References Cited

U.S. PATENT DOCUMENTS

| 862,867 | 8/1907 | Eggleston | 417/390 |
| 2,218,937 | 10/1940 | Myers et al. | 310/87 |
| 2,682,229 | 6/1954 | Luerberger | 310/87 |
| 3,163,790 | 12/1964 | White | 310/87 |

Primary Examiner—Carlton R. Croyle
Assistant Examiner—Timothy S. Thorpe
Attorney, Agent, or Firm—Peter K. Kontler

[57] ABSTRACT

A submersible motor pump wherein the thermal barrier between the pump housing and the motor housing contains at least one bellows or at least one cylinder and piston unit storing a supply of liquid for admission into the motor housing so as to maintain the motor housing in filled condition. The contents of the motor housing are circulated and cooled by a high-pressure cooler, and the liquid which is to be conveyed from the pressure equalizing device into the motor housing when the pressure of liquid in the pump housing rises is admitted into the motor housing by way of the cooler so that it is cooled prior to entering the motor housing. The shaft which is driven by the motor and rotates the impeller or impellers of the centrifugal pump in the pump housing extends through the thermal barrier and is surrounded by a seal receiving a sealing liquid from that source which supplies liquid to the chamber or chambers of the pressure equalizing device so as to compensate for liquid which is expelled from the chamber or chambers and enters the motor housing by way of the cooler.

14 Claims, 3 Drawing Figures

PRESSURE EQUALIZING DEVICE FOR THE ELECTRIC MOTOR OF AN ENCAPSULATED MOTOR-PUMP ASSEMBLY

BACKGROUND OF THE INVENTION

The present invention relates to motor-pump assemblies in general, and more particularly to improvements in encapsulated submersible motor-pump assemblies wherein the pump (normally a centrifugal pump) is called upon to circulate a liquid medium which is maintained at an elevated pressure as well as at an elevated temperature. Still more particularly, the invention relates to improvements in pressure equalizing systems for the liquid-filled housings or casings of electric motors which are used in such assemblies to drive the pump shaft.

It is already known to cool the liquid which fills the housing of the electric motor in a motor-pump assembly of the type wherein the pump circulates a liquid medium at an elevated temperature and at an elevated pressure and wherein the mechanical seal for the pump shaft is supplied with a sealing liquid. The seal is disposed between the pump housing or casing and the housing or casing for the electric motor. Such types of motor-pump assemblies are often employed under circumstances where the pump aspirates directly from its surrounding without a suction pipe, i.e., they can be said to constitute so-called submersible motor pumps. Submersible motor pumps often employ pressure equalizing devices which ensure that the pressure in the motor housing matches the pressure around the motor housing or in the pump housing. Pressure equalizing devices of conventional design can be divided into two categories the first of which employs a deformable membrane connected to the motor housing. The space at one side of the membrane communicates with the interior of the motor housing, i.e., one side of the membrane is acted upon by liquid which fills the motor housing. The other side of the membrane is contacted by liquid whose pressure matches or approximates that in the area surrounding the motor housing. To this end, the latter is formed with slots or other types of openings which may but need not contain check valves and serve to admit liquid from the area around the motor housing into contact with the other side of the membrane. Reference may be had to U.S. Pat. No. 2,962,612 granted Nov. 29, 1960 to Lung, to German Auslegeschrift No. 11 86 141 and/or to German Utility Model No. 18 45 050. The membrane can be said to constitute an elastic wall which takes care of pressure equalization, i.e., it ensures that the pressure of liquid in the motor housing matches the pressure of liquid around such housing.

A different pressure equalizing device is disclosed, for example, in U.S. Pat. No. 3,241,492 granted Mar. 22, 1966 to Arutunoff. This patent discloses an elastically deformable receptacle which is disposed externally of the motor-pump assembly and is connected with the interior of the motor housing by a suitable conduit. The principle of operation is the same as in assemblies wherein a membrane is disposed in the interior of or on the motor housing, i.e., the external surface of the deformable receptacle is acted upon by liquid which surrounds the motor housing and this ensures that the pressure of liquid in the motor housing (and in the interior of the deformable receptacle) matches the external pressure. The receptacle expands when the pressure in the motor housing rises above the pressure of liquid around the motor-pump assembly whereas, when the external pressure rises, the receptacle contracts and some of its contents are caused to flow into the motor housing.

It is further known to employ a pressure equalizing device which embodies a cylinder and piston unit as a substitute for the aforementioned membrane or deformable receptacle. The cylinder and piston unit is installed in a submersible motor-pump assembly with an electric motor, e.g., in a manner as disclosed in German Pat. No. 10 50 434. All of the aforediscussed conventional assemblies share the characteristic that the temperature of liquid in the motor housing matches or approximates the temperature of liquid in the surrounding area, i.e., the temperature at one side of the membrane is the same as, or it closely approximates that, at the other side of the membrane; the temperature in the deformable receptacle at least approximates that in the area around the receptacle; and the temperature of liquid in the cylinder and piston unit and in the motor housing on the one hand matches or approximates the temperature of liquid medium around the motor housing.

It has been found that the aforediscussed pressure equalizing devices are not entirely satisfactory in all situations which necessitate the use of submersible motor pumps, especially when the pump is required to circulate a liquid which is maintained at an elevated pressure as well as at an elevated temperature. The just outlined situations often arise in the processing of crude oil or in the liquefaction of carbon. As a rule, such motor-pump assemblies employ shaft seals in the form of bellows which seal the motor housing from the pump housing. The seal is protected from the adverse influence of solid particles by a clean sealing liquid which is fed into the pump housing and which also serves to cool the seal, i.e., to remove friction heat. The seal is designed in such a way that it opens in response to establishment of a pressure differential of the sealing liquid and that it closes when the delivery of sealing liquid is interrupted.

The liquid-filled motor is combined or equipped with a device which circulates highly pressurized liquid through a cooler. This ensures that the temperature of the motor is maintained within acceptable limits. As a rule, the means for circulating the liquid which fills the motor housing includes a rotor or impeller on the shaft which drives the impeller or impellers of the pump. When the motor is arrested and the just mentioned rotor comes to a halt, the liquid which fills the motor housing continues to circulate by flowing from the upper part of the motor housing, through the cooler, and into the lower part of the motor housing. When the delivery of sealing liquid is interrupted and the motor is idle, such natural circulation of liquid contents of the motor housing causes a reduction of the temperature of liquid in the motor housing so that the density of liquid in the motor housing increases with the result that the pressure drops below the pressure in the pump housing while the shaft seal is closed.

A similar situation can arise while the motor is running, i.e., the pressure of liquid which fills the motor housing can drop below the liquid pressure in the pump housing. This can take place, for example, in response to manipulation of the system which admits the sealing liquid. Still further, a change in the speed of the motor can entail a change of density of the liquid which fills the motor housing, primarily as a result of a change in temperature of such liquid. Under each of the just outlined circumstances, the pressure differential between the interior of the motor housing and the interior of the pump housing endangers the shaft seal as well as the thrust bearing for the motor shaft. For example, and in the absence of any remedial measures (such as the provision of a pressure equalizing device), the aforediscussed bellows of the shaft seal would be destroyed after a short period of operation during which the difference between the pressures of liquids in the motor housing and the pump housing exceeds a certain value, and the thrust bearing for the motor shaft would be subjected to excessive stresses.

Furthermore, under the aforedescribed severe circumstances, conventional pressure equalizing devices with membranes in the motor housing or with externally mounted elastically deformable receptacles are incapable of adequately protecting the shaft bearing and/or the thrust bearing for the motor shaft. The reasons for failure of such conventional pressure equalizing devices under the aforediscussed circumstances are manifold and include the utilization of motor-pump assemblies in a different environment but particularly the pronounced difference between the temperature of liquid in the pump housing on the one hand and the temperature of liquid in the motor housing on the other hand. Thus, if one would attempt to bring about an equalization of pressures which prevail in the two housings in a manner known from conventional pressure equalizing devices, this would necessarily result in an equalization or near equalization of temperatures. In other words, the temperature of liquid in the motor housing would be raised to the elevated temperature of liquid in the pump housing with the result that the useful life of temperature-sensitive component parts of the motor would be greatly reduced and the motor of the motor-pump assembly would necessitate frequent inspection, repair or replacement with attendant greatly increased maintenance cost and prolonged interruptions of operation.

OBJECTS AND SUMMARY OF THE INVENTION

An object of the invention is to provide a novel and improved motor-pump assembly which is constructed and assembled in such a way that pronounced or highly pronounced differences between the temperatures of liquids in the motor housing and pump housing cannot adversely influence the useful life and/or operation of the motor.

Another object of the invention is to provide novel and improved pressure equalizing means for use in a submersible motor pump.

A further object of the invention is to provide a motor-pump assembly wherein the liquid which is supplied to the motor housing in order to fill such housing is conditioned in a novel and improved way.

An additional object of the invention is to provide a motor-pump assembly which can employ a relatively simple seal between the motor housing and the pump housing, even if the liquid which is circulated by the pump is maintained at an elevated pressure as well as at a temperature which is likely to cause damage to some or all component parts of the motor.

Still another object of the invention is to provide a novel and improved method of cooling the liquid which is admitted into the motor housing of a motor-pump assembly when the motor housing is not filled to capacity.

A further object of the invention is to provide a novel and improved arrangement for storing the liquid which is to be admitted into the motor housing when the latter is not filled to capacity.

An additional object of the invention is to provide the motor-pump assembly with novel and improved means for supplying liquid to the shaft seal between the two housings simultaneously with admission of such liquid into the pressure equalizing device.

The invention resides in the provision of a novel combination of elements in an encapsulated motor-centrifugal pump assembly. The combination comprises a liquid-filled pump housing which is designed to contain a liquid at elevated pressure as well as at an elevated temperature, a liquid-filled motor housing which is sealed from the pump housing, a shaft which is driven by the motor in the motor housing and extends between and into the two housings, a seal which is disposed around the shaft between the two housings, a high-pressure cooler for the liquid contents of the motor housing to prevent excessive heating of component parts of the motor in such housing, means (including conduits, compartments and/or the like) defining a path for the circulation of liquid from the motor housing to the cooler and back into the motor housing, a pressure equalizing device defining a chamber which is arranged to store a supply of liquid for admission into the motor housing and has a mobile wall bounding a portion of the chamber and being subjected to the pressure of liquid in the pump housing, and means for connecting the chamber with the path defining means upstream of the cooler so that, when the pressure of liquid in the pump housing rises above the pressure of liquid in the chamber, and mobile wall of the pressure equalizing device expels liquid from the chamber into the path defining means and the expelled liquid is cooled prior to entering the motor housing.

The pressure equalizing device can include a bellows which defines the aforementioned chamber and includes the mobile wall. Alternatively, the pressure equalizing device can include a cylinder (such as a thermal barrier or cover between the two housings) which defines the aforementioned chamber. Such modified pressure equalizing device then further comprises a reciprocable piston which constitutes the mobile wall and one side of which is subjected to the pressure of liquid in the pump housing.

The improved combination preferably further comprises a source of sealing liquid and means for conveying sealing liquid from the source to the chamber to compensate for liquid which the mobile wall expels from the chamber in response to increasing pressure of liquid in the pump housing and/or decreasing pressure of liquid in the motor housing. The source preferably contains sealing liquid which is maintained at a pressure such as is required to open the seal, i.e., to permit sealing liquid to enter one of the housings. The two housings define at least one throttling passage which is normally sealed but is openable by pressurized liquid to permit the flow of pressurized liquid from the seal into the pump housing, and the pressure of sealing liquid preferably suffices to open such passage.

The combination can further comprise a cover which can constitute a thermal barrier between the two housings, and the pressure equalizing device can be installed in the cover, i.e., the cover can accommodate one or more bellows or it can define one or more cylinder chambers for reciprocable pistons constituting mobile walls and being capable of expelling liquid from the respective chambers into the path defining means upstream of the high-pressure liquid cooler. The cover or thermal barrier has at least one port for each of the chambers, and each such port establishes communication between the respective chamber and the interior of the pump housing. It is further preferred to provide filter means which is inserted into the port or ports or upstream of such port or ports to prevent penetration of solid impurities into contact with the mobile wall or walls of the pressure equalizing device. In other words, the filter means is or are interposed between the pressure equalizing device and the pump housing so that impurities which might be contained in the pump housing cannot penetrate into the pressure equalizing device. Alternatively, the combination can comprise means (such as a portion of the aforementioned thermal barrier or cover) defining one or more narrow passages in the form of slots, slits or the like and serving to intercept solids which would tend to flow from the pump housing into the pressure equalizing device. Such passage or passages can be used in lieu of the aforementioned port or ports and filter means.

A check valve is preferably interposed between the aforementioned source of sealing liquid and the chamber or chambers of the pressure equalizing device to prevent return flow of liquid from the interior of the motor housing. Still further, the combination can comprise a bypass circuit for supplying liquid from the path defining means to the seal in the absence of delivery of sealing liquid from the source. The bypass circuit can be defined, at least in part, by slots, slits or the like, and the combination can further comprise rotating threads or analogous means for circulating liquid in the bypass circuit.

The novel features which are considered as characteristic of the invention are set forth in particular in the appended claims. The improved assembly itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
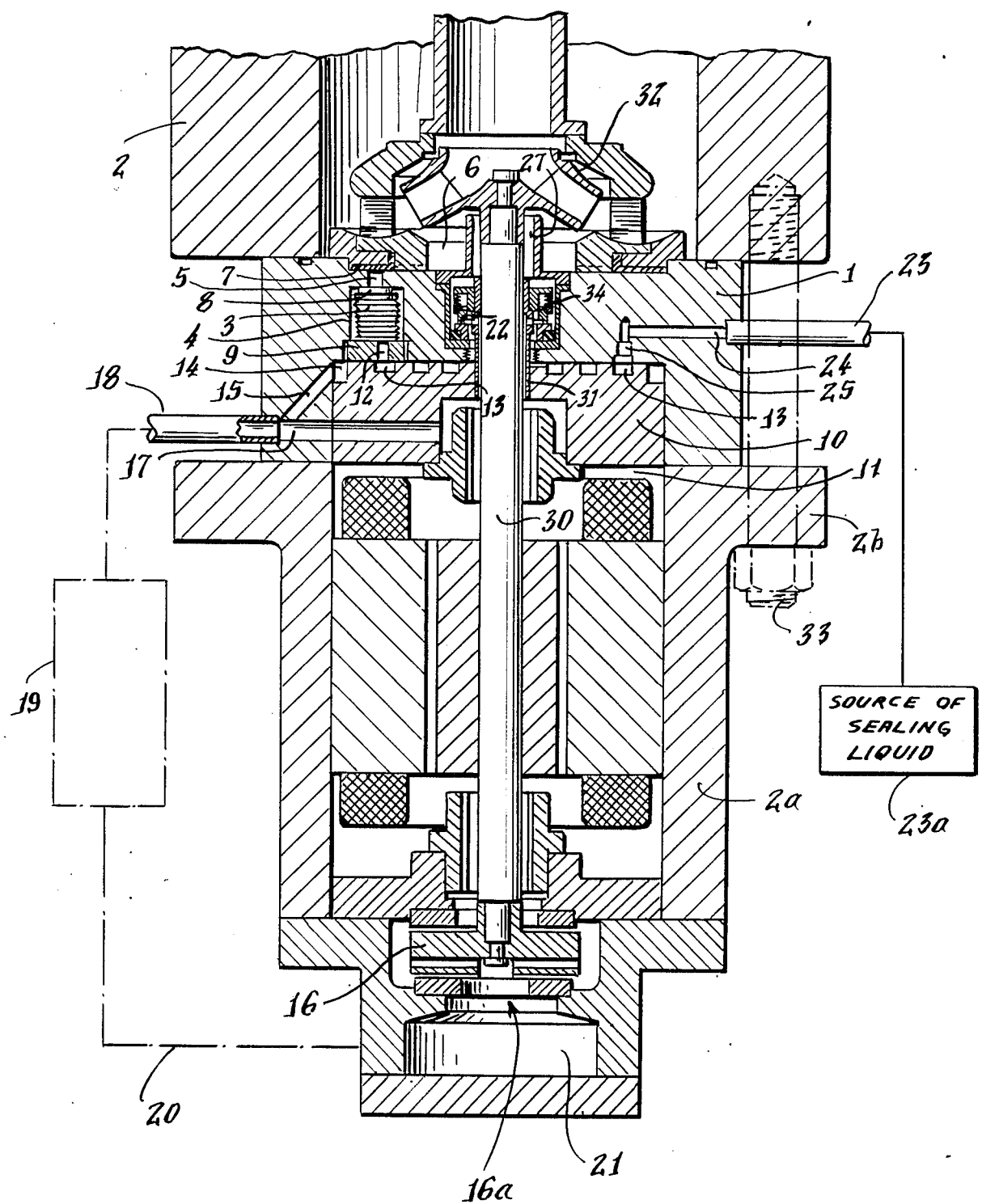
FIG. 1 is a fragmentary partly schematic axial sectional view of a motor-pump assembly which embodies one form of the invention and wherein the pressure equalizing device comprises a bellows.

Referring first to FIG. 1, there is shown a portion of a submersible motor-pump assembly having a housing or casing 2 which accommodates the centrifugal pump of the assembly. FIG. 1 merely shows the impeller 32 of the shaft 30 of the pump. The latter is assumed to circulate a liquid at an elevated pressure and at an elevated temperature. The housing 2a for the motor of the motor-pump assembly is connected with the pump housing 2 by a set of axially parallel bolts 33 extending through a flange 2b at the upper end of the motor housing 2a. The lower end of the housing 2 is sealed in part by a partition or cover 1 which constitutes a thermal barrier to prevent transfer of excessive quantities of heat from the interior of the housing 2 to the interior of the housing 2a. The cover or thermal barrier 1 is provided with at least one axially parallel preferably cylindrical compartment 4 for a pressure equalizing device 3 in the form of a bellows which can expand or contract as considered in parallelism with the axial direction of the motor-pump assembly. The upper part of the compartment 4 (above the rigid mobile top wall 8 of the bellows 3) communicates with the interior (space 6) of the pump housing 2 by way of a port or bore 5 which is machined into the cover 1. In order to prevent penetration of solid impurities into the compartment 4, the upper end of the port 5 is adjacent to a suitable filter 7 designed to intercept solids contained in the liquid medium which is being circulated by the pump in the housing 2 so that such solids are prevented from entering the pressure equalizing device.

The bellows 3 comprises the aforementioned mobile top wall 8 and a rigid bottom wall 9 which is threaded into the thermal barrier or cover 1 so that it is disposed in the lower part of the compartment 4. The flexible portion of the bellows 3 can be welded or otherwise sealingly secured to the walls 8 and 9. The connection between the cover portion surrounding the lower part of the compartment 4 and the bottom wall 9 of the bellows 3 is fluidtight to prevent direct flow of liquid from the port 5 into a bore or port 12 in the bottom wall 9 or vice versa. Instead of being provided with external threads, the bottom wall 9 can be a press-fit in the lower part of the compartment 4 and can be held in requisite position by a cooling member or lid 10 which is immediately adjacent to the underside of the cover or thermal barrier 1.

The capacity of the bellows 3 is selected in such a way that the chamber between the walls 8 and 9 can store that quantity of liquid which is necessary to ensure that the pressure in the motor housing 2a is maintained at a given value. However, the chamber of the bellows 3 is not in direct communication with the interior of the motor housing 2a.

When the pressure in the interior of the motor housing 2a drops (e.g., in the event of failure to deliver a sealing liquid to the mechanical shaft seal 22 which surrounds the pump shaft 30 in the interior of the cover or thermal barrier 1), the pressure of liquid in the pump housing 2 rises above the pressure in the motor housing 2a whereby the liquid which fills the housing 2 penetrates into the upper part of the compartment 4 by flowing through the filter 7 and port 5 so that the mobile top wall 8 of the bellows 3 moves toward the bottom wall 9 and a certain amount of liquid which fills the chamber of the bellows 3 escapes via bore or port 12 of the bottom wall 9 to flow into a high-pressure cooler 19 on its way toward the interior (space 11) of the motor housing 2a. The extent of movement of the top wall 8 toward the bottom wall 9 is a function of the difference between the pressures in the space 6 and the space 11.

The liquid which is expelled from the chamber of the bellows 3 via bore or port 12 of the bottom wall 9 flows into a channel 13 which is machined into or otherwise formed in the upper side of the lid 10, from the channel 13 into an annular groove 14 in the upper side of the lid 10, from the groove 14 into an outwardly and downwardly sloping bore 15 of the lid 10, and thence into a conduit 18 which defines a portion of an endless path for the circulation of cooling liquid for the motor in the housing 2a. The cooling liquid is caused to circulate by a disc-shaped impeller or rotor 16 forming part of a thrust bearing 16a for the lower end of the pump shaft 30. The liquid which fills the housing 2a is caused to flow into a radially extending channel or bore 17 of the lid 10 and thence into the aforementioned conduit 18 which admits liquid to the inlet of the high-pressure cooler 19. A further conduit 20 connects the outlet of the cooler 19 with the lower portion 21 of the space 11 in the housing 2a, i.e., into the range of the rotary impeller 16. The cooler 19 is designed in such a way that, when the electric motor in the housing 2a is idle, the liquid which fills the housing 2a continues to circulate along the endless path which is defined by the bore 17, conduit 18, cooler 19, conduit 20 and space 11. This ensures that, when the pressure of such liquid drops, the relatively hot contents of the chamber of the bellows 3 are compelled to flow through the cooler 19 prior to entering the motor housing 2a. In other words, the space 11 in the housing 2a cannot receive a very hot liquid directly from the chamber of the bellows 3; such liquid must be cooled at 19 prior to entering the lower portion 21 of the space 11.

The chamber of the bellows 3 is filled with liquid (while the motor-pump assembly is idle or in use) by way of a conduit 23 which also serves to supply sealing liquid to the shaft seal 22. The conduit 23 is connected to a source 23a and admits sealing liquid to a bore 24 which is machined into or otherwise formed in the cover 1 and discharges liquid into the aforementioned channel 13 by way of a check valve 25. The channel 13 can admit sealing liquid into the chamber of the bellows 3 through the bore 12 in the bottom wall 9. A second bore 26 communicates with the channel 13 and serves to admit sealing liquid to the seal 22.

The seal 22 is designed in such a way that it opens (against the resistance of a spring 34) away from the motor in the housing 2a when the pressure of liquid rises and thus permits a stream of sealing liquid to flow into the seal. When the delivery of sealing liquid is interrupted, the seal 22 closes under the action of the spring 34 and seals the space 11 in the housing 2a from the space 6 in the housing 2. The pressure differential which is necessary to open the seal 22 and the throttling passages or gaps 27 which are disposed downstream of the seal entails an expansion of the bellows 3 so that the chamber of the bellows is filled with fresh (and hence clean) sealing liquid.

Figure 2:
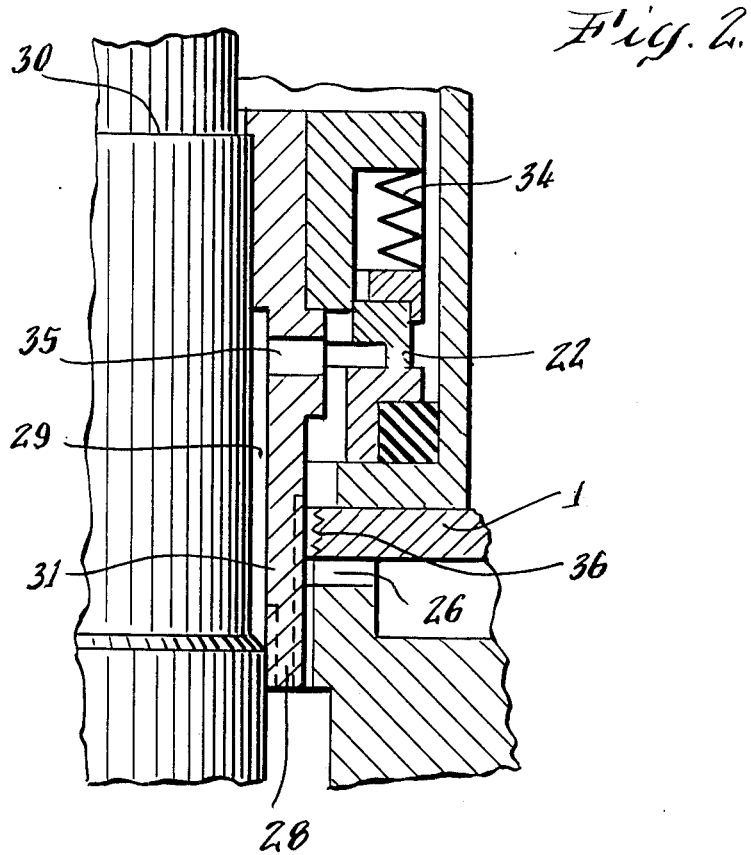
FIG. 2 is an enlarged view of a detail in the structure of FIG. 1, showing the construction of the shaft seal.

The purpose of the check valve 25 which is disposed downstream of the bore 23 is to prevent pronounced losses of liquid filling the space 11 in the motor housing 2a when the admission of sealing liquid is interrupted. If the admission of sealing liquid is interrupted for a relatively short interval of time, the seal 22 is closed and is then cooled (in order to remove friction heat which develops when the shaft 30 rotates) by a bypass stream of sealing liquid. Such bypass stream flows through a circuit including slots 28 (note FIG. 2), a clearance 29 between the shaft 30 and a sleeve 31 which is applied directly to the shaft 30, and through radial bores 35 on to the seal 22 wherefrom the bypass stream flows to the cooling channel means of the cover 1. The liquid advancing effect of the radial bores 35 assists the pumping action of the high-pressure cooler 19.

Figure 3:
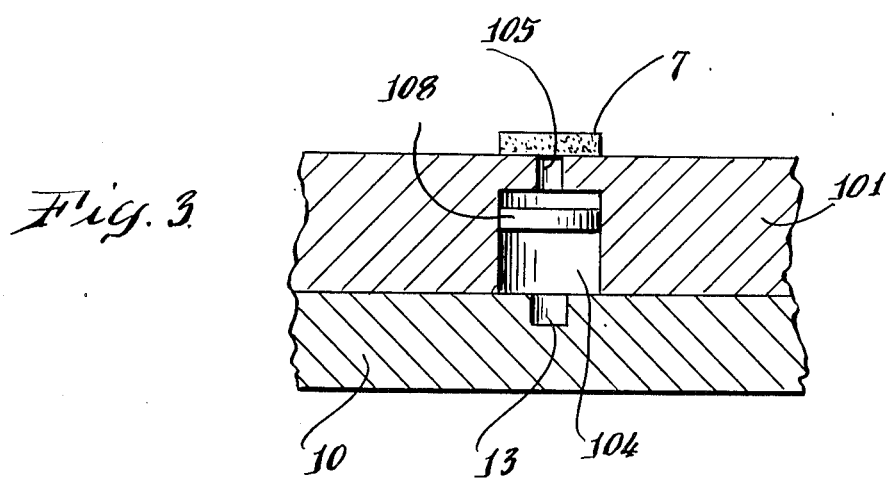
FIG. 3 is a fragmentary axial sectional view of a modified motor-pump assembly wherein the pressure equalizing device comprises a cylinder and piston unit.

If desired, the bellows 3 can be replaced by another pressure equalizing device, e.g., by a cylinder and piston unit of the type shown in FIG. 3. This unit comprises a cylinder chamber 104 in a cylinder or cover 101 and a mobile piston 108 which is reciprocable in the chamber 104 so as to move downwardly when the pressure in the space 6 of the pump housing 2 (not shown in FIG. 3) increases, and to move upwardly in response to admission of a fresh supply of sealing liquid in a manner as described in connection with FIGS. 1 and 2. The cover 101 has a bore or port 105 corresponding to the port 5 shown in FIG. 1.

It is further clear that the improved motor-pump assembly can employ two or more bellows or two or more cylinder and piston units without departing from the spirit of the invention.

It is also within the purview of the invention to place the bellows or the cylinder and piston unit outside of the confines of the housing 2 and 2a, i.e., to install the pressure equalizing device outside of the motor-pump assembly in a pressure-resistant housing or vessel which is connected with the space 6 by a first conduit replacing the port 5 or 105 and which can admit liquid into the path for cooling liquid by way of a second conduit corresponding to the bore 12 of FIG. 1 or to the channel 13 shown in FIG. 3.

An important advantage of the improved motor-centrifugal pump assembly is that the supply of sealing liquid which fills the chamber of the bellows 3 or the cylinder chamber 104 below the piston 108 cannot communicate directly with the space 11 in the motor housing 2a. Instead, such liquid must enter the path for circulation of cooling liquid for the motor in the space 11 by entering such path upstream of the high-pressure cooler 19. In other words, the liquid which issues from the chamber of the bellows 3 or from the chamber 104 to flow into the space 11 must be cooled before it enters the housing 2a. The temperature of liquid in the bellows 3 or in the chamber 104 necessarily matches or approximates the elevated temperature of liquid in the space 6 because such liquids are separated only by the relatively thin mobile top wall 8 or by the equally thin mobile piston 108. In other words, it is not necessary to provide discrete cooling means for the liquid which fills the chamber of the bellows 3 or the cylinder chamber 104, and it is equally unnecessary to provide a discrete thermal barrier between the contents of the bellows 3 or chamber 104 on the one hand and the liquid in the space 6 of the pump housing 2 on the other hand. The feature that the contents of the bellows 3 or chamber 104 are cooled prior to admission into the space 11 brings about the additional advantage that the motor-pump assembly can employ a relatively simple and inexpensive shaft seal, e.g., a single-acting mechanical seal of the temperature-resistant bellows-type or a seal with spring bias and temperature-resistant secondary sealing elements will suffice when the pressure equalizing liquid (in the chamber of the bellows 3 or in the chamber 104) is cooled prior to admission into the motor housing 2a. In the absence of such cooling of the pressure equalizing liquid, the shaft seal 22 would have to employ a second seal, such as a spring-biased shaft seal, in order to protect the bellows of the primary seal from destruction in the event of a malfunction and when the pressure differential between the spaces 6 and 11 rises toward and exceeds a given threshold value.

Another important advantage of the improved motor-pump assembly is that the chamber of the bellows 3 or the cylinder chamber 104 below the piston 108 can receive liquid from the same source (23a) which supplies sealing liquid to the shaft seal 22. The pressure of liquid which is supplied via conduit 23 is such that it suffices to open the shaft seal 22 and to overcome the resistance of throttling passage or passages 27 (if any). This contributes to automation of the system, i.e., the system operates in such a way that the pressure-maintaining liquid stream is superimposed upon the cooling stream.

As mentioned above, the provision of a one-way valve (check valve 25) in the means for supplying liquid to the chamber of the bellows 3 or to the chamber 104 from the source 23a of sealing liquid brings about the advantage that the losses in liquid filling the space 11 are reduced to an acceptable value even in the event of longer-lasting interruption of admission of sealing liquid. When the interval of interruption of delivery of sealing liquid is relatively short, the aforementioned bypass circuit takes over the function of cooling the seal 22. At such time, the seal 22 is closed and generates friction heat. If desired, the flow of bypass liquid can be assisted by suitable auxiliary liquid flow promoting means such as threads 36 or the like, i.e., such auxiliary means can assist the cooler 19 in circulating the liquid which cools the seal 22 when the latter does not receive sealing liquid for a relatively short interval of time.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. In an encapsulated motor-centrifugal pump assembly, the combination of a liquid-filled pump housing; a liquid filled motor-housing; a shaft extending between and into said housings; a seal disposed around said shaft between said housings; a high-pressure cooler for circulating and cooling the liquid contents of said motor housing; means defining a path for the circulation of liquid from said motor housing to said cooler and from said cooler back into said motor housing; a pressure equalizing device defining at least one chamber arranged to store a supply of liquid for admission into said motor housing and having a mobile wall bounding a portion of said chamber and subjected to the pressure of liquid in said pump housing; means for connecting said chamber with said path defining means upstream of said cooler so that, when the pressure of liquid in said pump housing rises above the pressure of liquid in said chamber, the mobile wall expels liquid from said chamber into said path defining means and the thus expelled liquid is cooled prior to entering said motor housing; a source of sealing liquid; and means for conveying sealing liquid from said source to said seal and into said chamber so as to compensate for liquid which said mobile wall expels from said chamber.

2. The combination of claim 1, wherein said pressure equalizing device includes a bellows which defines said chamber and includes said mobile wall.

3. The combination of claim 1, wherein said pressure equalizing device includes a cylinder which defines said chamber and a piston which constitutes said mobile wall.

4. The combination of claim 1, wherein said seal is openable by pressurized liquid and said source contains liquid which is maintained at a pressure sufficient to open said seal.

5. The combination of claim 4, wherein said housings define at least one throttling passage which is normally sealed but is openable by pressurized liquid to permit liquid to flow from said seal into said pump housing, the pressure of sealing liquid in said source being sufficiently high to open said passage.

6. The combination of claim 1, further comprising a cover interposed between said housings, said pressure equalizing device being installed in said cover.

7. The combination of claim 6, wherein said cover has a bore which establishes communication between one side of said mobile wall and the interior of said pump housing.

8. The combination of claim 1, further comprising a thermal barrier between said housings, said pressure equalizing device being installed in said thermal barrier.

9. The combination of claim 8, wherein said thermal barrier has a port which establishes communication between one side of said mobile wall and the interior of said pump housing.

10. The combination of claim 1, further comprising filter means interposed between said pressure equalizing device and said pump housing.

11. The combination of claim 1, further comprising means defining at least one narrow solids-intercepting passage between said pressure equalizing device and the interior of said pump housing.

12. The combination of claim 1, further comprising a check valve in said conveying means.

13. The combination of claim 1, further comprising a bypass circuit for supplying liquid from said path defining means to said seal in the absence of delivery of sealing liquid from said source.

14. The combination of claim 13, wherein said bypass circuit is defined in part by slot means and further comprising auxiliary means for circulating liquid in said bypass circuit.

* * * * *